(12) United States Patent
Kim et al.

(10) Patent No.: US 10,264,004 B2
(45) Date of Patent: Apr. 16, 2019

(54) SYSTEM AND METHOD FOR CONNECTION FINGERPRINT GENERATION AND STEPPING-STONE TRACEBACK BASED ON NETFLOW

(71) Applicant: ELECTRONICS AND TELECOMMUNICATIONS RESEARCH INSTITUTE, Daejeon (KR)

(72) Inventors: Jung Tae Kim, Daejeon (KR); Koo Hong Kang, Daejeon (KR); Ik Kyun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 186 days.

(21) Appl. No.: 15/345,354

(22) Filed: Nov. 7, 2016

(65) Prior Publication Data
US 2017/0134413 A1   May 11, 2017

(30) Foreign Application Priority Data

Nov. 9, 2015 (KR) .................. 10-2015-0156952
Apr. 28, 2016 (KR) .................. 10-2016-0052154

(51) Int. Cl.
*H04L 12/26* (2006.01)
*H04L 29/06* (2006.01)

(52) U.S. Cl.
CPC ........ *H04L 63/1425* (2013.01); *H04L 43/026* (2013.01); *H04L 43/04* (2013.01); *H04L 43/10* (2013.01); *H04L 2463/146* (2013.01)

(58) Field of Classification Search
CPC .................. H04L 63/1425; H04L 63/026
(Continued)

(56) References Cited

U.S. PATENT DOCUMENTS

2001/0014093 A1* 8/2001 Yoda ................. H04L 43/00
370/389
2005/0278779 A1* 12/2005 Koppol ............. H04L 63/1425
726/22
(Continued)

FOREIGN PATENT DOCUMENTS

KR  10-2009-0009622 A   1/2009
KR     10-1267493 B1     5/2013

*Primary Examiner* — Eleni A Shiferaw
*Assistant Examiner* — Angela R Holmes

(57) ABSTRACT

The method for tracking a cyber hacking is provided. The method of connection fingerprint generation and stepping-stone traceback based on NetFlow includes receiving a traceback request including IP packet attribute information of a victim and an attacker which corresponds to a target connection that is the last connection on a connection chain, generating a fingerprint for an associated connection based on the IP packet attribute information and requesting a NetFlow collector for relevant information, detecting a stepping-stone connection to the target connection which is generated at the time of generation of the fingerprint and instructing to check whether sorted candidate connections are present on the same connection chain as the target connection, and determining an order of the candidate connections based on an attacker host when the candidate connections are determined to be present on the same connection chain as the target connection.

20 Claims, 6 Drawing Sheets

(58) Field of Classification Search
USPC .......................................................... 726/22
See application file for complete search history.

(56) References Cited

U.S. PATENT DOCUMENTS

| | | |
|---|---|---|
| 2010/0212013 A1 | 8/2010 | Kim et al. |
| 2013/0262703 A1* | 10/2013 | Dong ...................... H04L 47/38 |
| | | 709/247 |
| 2014/0355440 A1 | 12/2014 | Kang et al. |
| 2015/0256555 A1 | 9/2015 | Choi et al. |

* cited by examiner

SYSTEM AND METHOD FOR CONNECTION FINGERPRINT GENERATION AND STEPPING-STONE TRACEBACK BASED ON NETFLOW

CROSS-REFERENCE TO RELATED APPLICATION

This application claims priority to and the benefit of Korean Patent Application No. 10-2015-0156952, filed on Nov. 9, 2015, and Korean Patent Application No. 10-2016-0052154, filed on Apr. 28, 2016, the disclosure of which is incorporated herein by reference in its entirety.

BACKGROUND

1. Field of the Invention

The present invention relates to a technology for tracking a cyber hacking attack, and more specifically, to a system and method for generating a fingerprint of a connection and tracing back the origin of an attack using network flow (NetFlow) data.

2. Discussion of Related Art

A technology for tracing back a cyber hacking attack is to locate a hacker's real location, i.e., the origin of an attack, even when the location of an attack system differs from the real location of the hacker who actually attempts to hack a system.

As technologies for tracing back the cyber hacking attack according to the related arts, host-based TCP connection traceback, network IP packet-based traceback, and a traceback method which finds an original transmitter of packets with respect to IP spoofing have been suggested.

The host-based TCP connection traceback method uses traceback modules installed in all systems to locate the real location of a hacker that has passed through other multiple systems.

The network IP packet-based traceback method uses a traceback module installed at a location where it is possible to observe network packets to locate the real location of a hacker that has passed through other multiple systems.

All of the above-described related arts have a problem in that Internet service provider (ISP) overhead exists.

In addition, a honeypot decoy server as a bait for a hacker and automatic hacker tracing software have been developed, but they can only operate in certain environments of a virtual network.

According to the related arts, all network traffic packets and communication connections are to be monitored, and thus resulting overhead is significant, and especially when an attack via a network device (router) or an ISP which do not support a traceback function, traceback is not possible.

That is, according to the related arts, dedicated monitoring devices are to be installed in a distributed manner over the network or Internet protocols are to be altered, and hence it is practically impossible to be applied to a real network.

SUMMARY OF THE INVENTION

In order to address the problems of related arts that a dedicated monitoring device is required and hence it is practically difficult to apply to the Internet environment and that in the case where an attacker's information is hidden using IP spoofing or other methods, detection is difficult, the present invention provides a method of connection fingerprint generation and stepping-stone traceback based on NetFlow, which is not limited in application to the existing Internet environment, minimizes overhead, and is capable of tracing back the origin of an attack by utilizing NetFlow information provided by a router.

In one general aspect, there is provided a method of connection fingerprint generation and stepping-stone traceback based on NetFlow includes: receiving a traceback request including IP packet attribute information of a victim and an attacker which corresponds to a target connection that is the last connection on a connection chain; generating a fingerprint for an associated connection based on the IP packet attribute information and requesting a NetFlow collector for relevant information; detecting a stepping-stone connection to the target connection which is generated at the time of generation of the fingerprint and instructing to check whether sorted candidate connections are present on the same connection chain as the target connection; and determining an order of the candidate connections based on an attacker host when the candidate connections are determined to be present on the same connection chain as the target connection.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and methods of achieving the same will be apparent by referring to the embodiments described below in detail with reference to the accompanying drawings.

However, the present invention is not limited to the embodiments described below and various modifications may be made thereto. The embodiments are merely provided to thoroughly disclose the invention and to convey the category of the invention to one of ordinary skill in the art. The present invention is defined by the appended claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to FIGS. 1 to 5.

The present invention suggests a method of generating fingerprints for connection flows using NetFlow information, which is generally provided by routers, and comparing the fingerprints in order to trace back the origin of an attack.

Figure 1:
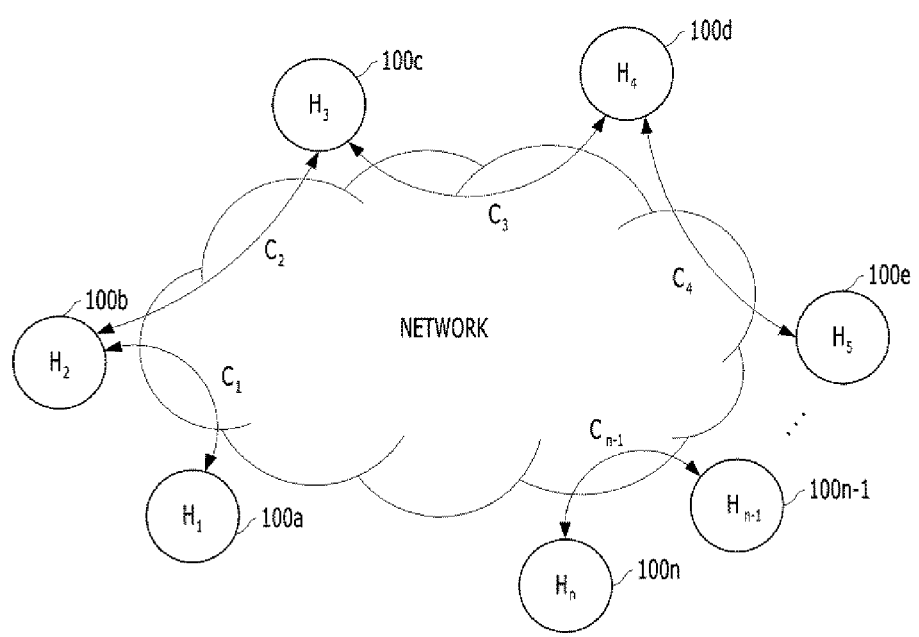
FIG. 1 is a conceptual diagram illustrating a connection chain according to one embodiment of the present invention.

FIG. 1 is a conceptual diagram illustrating a connection chain according to one embodiment of the present invention.

According to one embodiment, in an interactive service, such as Telnet, SSH, rlogin, etc., stepping stones are detected through ON/OFF modeling of connections, using the inactive time feature of NetFlow.

For example, an attacker establishes a connection chain $C_1$ to $C_{n-1}$ with a set of hosts (computers) including host 1 $H_1$ 110a to host n $H_n$ 110n using remote logon.

$H_1$ is an attacker's own computer, and $H_n$ is a final target of the attacker to be attacked, and a connection $C_i$ represents a connection which is established from $H_i$ to $H_{i+1}$ using a remote logon service.

The above example shows that host $H_i$ attempts to remotely access host $H_{i+1}$ using an interactive service client through Telnet, SSH, rlogin, or the like.

In the interactive service, a bidirectional connection is established between a client and a server, but the embodiment of the present invention focuses only on a downstream connection from an attacker $H_1$ to a victim computer $H_n$.

In addition, the embodiment of the present invention assumes that with respect to the last connection $C_{n-1}$ (hereinafter, will be referred to as a "target connection") of the attacker, connection time and packet attribute information (as 5-tuple information including a source IP address, a destination IP address, a source port number, a destination port number, and a layer 3 protocol) are known and information about NetFlow records regarding the corresponding connection is stored in a NetFlow collector.

According to one embodiment of the present invention, an algorithm for finding connections $C_1$ to $C_{n-2}$ each of which forms the same connection chain as the target connection $C_{n-1}$ by searching for pieces of NetFlow information collected through an arbitrary router is proposed.

When data in a flow of a layer 4 connection does not exist for T-idle seconds or more, the corresponding connection is assumed to be in an OFF period, and when a packet carrying data appears, the corresponding flow terminates the OFF period, initiates an ON period, and maintains the ON period until an event occurs in which data does not exist again for T-idle seconds or more.

As described above, the modeling of traffic by the ON/OFF period is based on time intervals of user's keystrokes.

According to one embodiment of the present invention, on the basis of the ON/OFF model, when two connections $C_1$ and $C_2$ are given, when time instances at which the respective OFF periods of the two connections end (i.e., time instances at which ON periods start) are similar, it is determined that the two connections are in a "stepping-stone" relation to each other.

That is, a user's keystroke is transmitted over $C_1$ and then transmitted over $C_2$.

Figure 2:
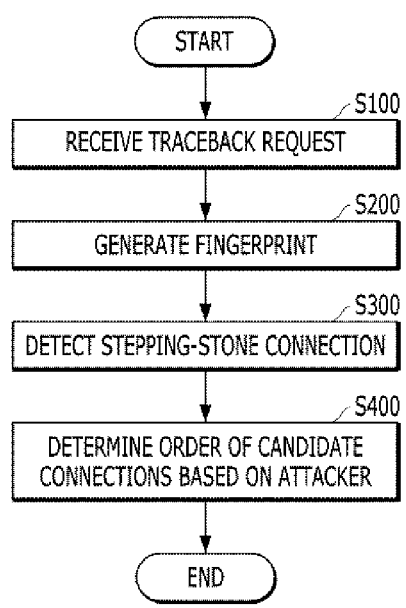
FIG. 2 is a flowchart illustrating a method of connection fingerprint generation and stepping-stone traceback based on NetFlow according to one embodiment of the present invention.

FIG. 2 is a flowchart illustrating a method of connection fingerprint generation and stepping-stone traceback based on NetFlow according to one embodiment of the present invention.

According to one embodiment, the method includes receiving a user request for traceback (S100), generating fingerprints for associated connections (S200), detecting a stepping-stone connection (S300), and determining the order of candidate connections based on an attacker host (S400).

Figure 3:
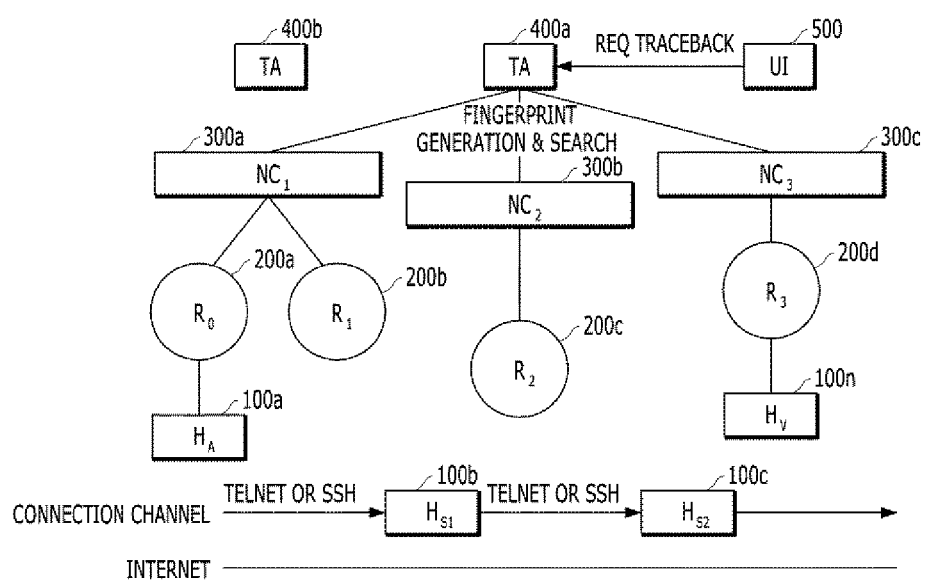
FIG. 3 is a block diagram illustrating a system for connection fingerprint generation and stepping-stone traceback based on NetFlow according to one embodiment of the present invention.

Referring to FIG. 3, a plurality of trace agents (TA) 400 each operate in a distributed network environment, and the plurality of TAs 400a and 400b share information based on peer-to-peer (P2P).

Routers 200 which are present on the Internet periodically transmit NetFlow setting and transmission information to corresponding NetFlow collectors 300, and the NetFlow collectors 300 each store the collected NetFlow information for each time interval.

According to one embodiment of the present invention, a NetFlow full sampling rate or a default setting value (the default value of an inactive timer is 10 seconds and the default value of an active timer is 30 minutes) of the router 200 is utilized.

The default setting values described above may vary depending on the characteristics of the router 200 or a switching device.

In S100, a traceback request (Req Traceback) is received through a user interface (UI), in which the traceback request includes flow information of a victim 100n and the last attacker that corresponds to a target connection which is the last connection on the connection chain.

That is, a collection of pieces of IP packet attribute information forms a flow, and the flow is a unidirectional communication session, which is a pair of bidirectional flows which match to each other.

The above-described TA 400a that receives the traceback request generates a fingerprint for the associated connection on the basis of IP addresses of the victim 100n and the last attacker on the connection chain, port information, time information regarding the attack committed, and protocol information and requests each NetFlow collector 300a, 300b, and 300c to send relevant information (fingerprint search).

Fingerprints are generated by the respective NetFlow collectors 300a, 300b, and 330c on the basis of connection flow information found at the corresponding time, and the flows are compared with each other in terms of mutual similarity, so that stepping stones 100b and 100c and an origin 100a of the attack are traced back.

According to one embodiment of the present invention, traceback based on timing of a specific connection is performed using NetFlow information which is transmitted from the router 200 and stored in the NetFlow collector 300, and to this end, the stepping stones 100b and 100c are traced back using an ON/OFF pattern which is a characteristic of interactive traffic.

Hereinafter, an algorithm for fingerprint generation in accordance with one embodiment of the present invention will be described with reference to FIG. 4.

The algorithm for fingerprint generation in accordance with one embodiment of the present invention receives IP packet attribute information from the last connection ($C_{n-1}$ in FIG. 1 which corresponds to a target connection, a network management system in which the final target host is present) present on a connection chain and generates a fingerprint.

The above-described IP packet attributes may include attack start time Ts, attack end time Te, an attack source IP address srcaddr, attack source port number srcport, a destination IP address dstaddr, a destination port number dstport, and layer 3 protocol information.

Packets passing through a switch or a router may be classified by IP packet attributes, which serve as fingerprints or identifications of individual IP packets, and by using the IP packet attributes, it is possible to distinguish whether one packet is a new packet or is similar to another packet.

In S210, sanity check of a NetFlow UDP diagram is performed, in which the version/size (datagram size) of NetFlows exported from the routers and collected by the NetFlow collectors is checked through checking the size of datagram using the version and count fields contained in a header format.

Then, in S220, sequencing of flow export information of the collected NetFlows is performed using the SysUptime field contained in the header format.

In S230, it is checked whether there is a loss of flow export information using the count and flow_sequence fields contained in the header format.

In the absence of loss, in S240, layer 4 connection information is acquired using attack source IP address srcaddr, attack source port number srcport, destination IP address dstaddr, destination port number dstport, and layer 3 protocol fields contained in the flow record format on the basis of the time from $T_s$ (attack start time) to $T_e$ (attack end time).

In this case, the layer 4 connection information includes target layer 4 assembly, $t_s$ (connection start time), and $t_e$ (connection end time).

In this case, since a number of target layer 4 connections may exist between $T_s$ (attack start time) and $T_e$ (attack end time), the connections are sorted for each TCP layer 4 using TCP flag (SYN/FIN/RST).

Then, in S250, in the case where N flow records $R_1$ to $R_N$ are present in a TCP layer 4 with respect to IP packet attributes of the target connection, a value calculated from a last value minus a first value in a specific flow record $R_i$ is set as the $i^{th}$ ON time, and when the ON time is smaller than a predetermined time (a specified delta time), the flow record $R_i$ is removed.

Through the above-described ON time merging, n flow records $R_1$ to $R_n$ (n is equal to or smaller than N) are acquired.

Thereafter, in S260, ON/OFF time series for each TCP layer 4 with respect to the n flow records acquired in S250 is generated.

With respect to i which is greater than 1 and equal to or smaller than n, the value calculated from the last value minus the first value in $R_i$ is set as the $i^{th}$ ON time, a difference between the first value of flow record $R_i$ and the last value of flow record $R_{i-1}$ is set as OFF time of the $(i-1)^{th}$ flow record, and in the case in which i is 1, only the first ON time is calculated.

Accordingly, in S260, an ON/OFF time series of <ON1, OFF1, ON2, OFF2 to OFFn-1, ONn> is generated.

In S270, when a plurality of time series are generated through the above-described procedures, a time series with the longest length is selected (dominant ON/OFF time sequence selection), and finally a fingerprint is generated by taking into account setup time of the selected ON/OFF time series.

Hereinafter, with respect to one target layer 4 connection formed by the algorithm for fingerprint generation which is described above in FIG. 4, an algorithm for detecting a stepping-stone connection present on the same connection chain will be described with reference to FIG. 5.

Figure 4:
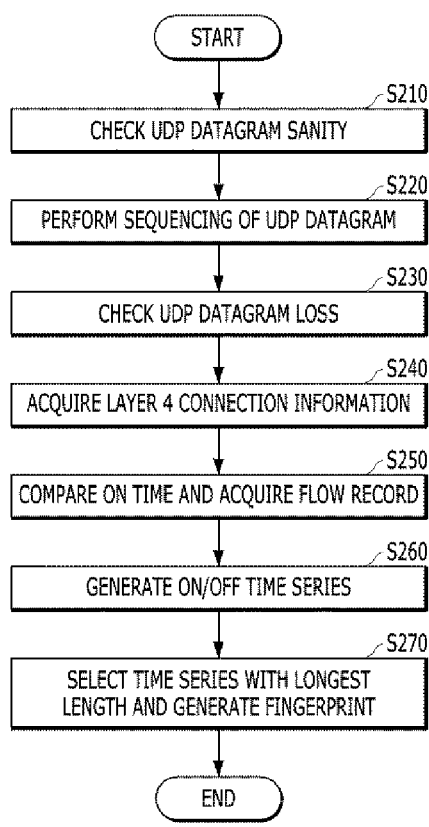
FIG. 4 is a flowchart illustrating an algorithm for fingerprint generation according to one embodiment of the present invention.
Figure 5:
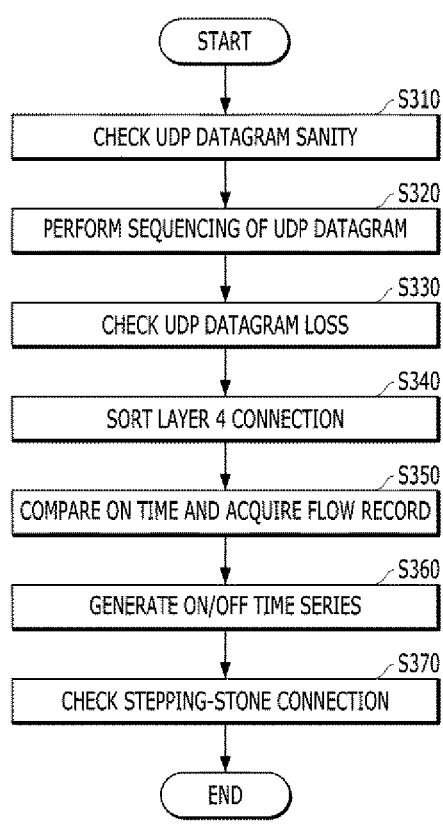
FIG. 5 is a flowchart illustrating an algorithm for stepping-stone connection detection according to one embodiment of the present invention.

The algorithm for detecting a stepping-stone connection as shown in FIG. 5 searches for stepping-stones present on the same connection chain based on <$t_s$ (connection start time), $t_e$ (connection end time), TS (time series), {option=protocol, etc.}> with respect to one target layer 4, wherein operations S310 to S330 perform the same processes as those of operations S210 to S230 of FIG. 4, respectively.

That is, in S310, sanity check of a NetFlow UDP diagram is performed, in which the version/size (datagram size) of NetFlows exported from the routers and collected by the NetFlow collectors is checked through checking the size of datagram using the version and count fields contained in a header format; in S320, sequencing of flow export information of the collected NetFlows is performed using the SysUptime field contained in the header format; and in S330, it is checked whether there is a loss of flow export information using the count and flow_sequence fields contained in the header format.

In S340, information about a candidate connection that is maintained from $t_s$ (connection start time) to $t_e$ (connection end time) of the target layer 4 connection is acquired, wherein in the case of the presence of {option} field, the candidate connection information which includes the contents of the field is acquired.

For example, in S340, in the case of {option=layer 3 protocol}, candidate connection information that satisfies the requirement is acquired, and layer 4 candidate connections whose connection start time and connection end time include $t_s$ and $t_e$ of the target layer 4 connection are sorted using a transport control protocol (TCP) flag (SYN/FIN/RST).

Operations S350 and S360 illustrated in FIG. 5 perform the same processes as those of the above-described operations S250 and S260 of FIG. 4. In S350, through the ON time merging, flow records are sorted, and in S360, an ON/OFF time series for each TCP layer 4 is generated with respect to the flow records sorted in S350.

In S370, check of correlation between a time series (TS) of the fingerprint generated by the algorithm of FIG. 4 and a time series of the candidate connection generated in S360 is performed.

Hereinafter, an algorithm for stepping-stone connection correlation comparison will be described in detail, and the operation S370 will be described in more detail.

In order to check whether the candidate connection is present on the same connection chain as the target connection, X and Y correlations between the two connections are compared with each other.

According to one embodiment of the present invention, the similarity between two vectors is quantitatively calculated and represented as a ratio of the minimum element sum and the maximum element sum (referred to as "Min/Max Sum Ratio (MMS)"), and the MMS is used as a correlation point function (CPF).

Under the assumption that there is no NetFlow UDP packet loss when using stream control transmission protocol (SCTP), CPF of a set of X vectors <$x_1$ to $x_m$> of target connection and a set of Y vectors <$y_1$ to $y_k$> of candidate connection is calculated by the following Equation 1.

$$CPF(X, Y_k, s) = \sum_{l=1}^{m} \min(x_l, y_{l+s}) \bigg/ \sum_{l=1}^{m} \max(x_l, y_{l+s}) \qquad \text{[Equation 1]}$$

In this case, s denotes a correlation offset (comparison start point), which satisfies an expression of (0≤s≤k−m). This is because, in order for the candidate connection to be correlated with the target connection, the requirement that the size of Y vector is greater than the size of X vector has to be satisfied.

Also, this is because of sequential generation and termination features of connection chain formation using an interactive service which has to satisfy an expression of (k>m) in order to form a single connection in which the candidate connections are present on the same connection chain, because the target connection is the last connection $C_{n-1}$ on the connection chain.

In addition, m denotes the size of X vector, i.e., |X|, and s denotes a start offset (correlation offset) of $Y_K$, as described above.

Therefore, when the size of $Y_k$ is r, a requirement of an expression of (0≤s≤r−m) is met, and if r is smaller than m, the calculation is omitted and a value of CPF is set to "0."

The above Equation 1 gives a value of correlation obtained from the start offset s of the candidate connection up to m with respect to the target connection.

After calculating the CPF by incrementing the correlation offset one by one, the maximum value is found and defined as a correlation value (CV), and thereafter, in order to compare two connections for checking whether the two connections are present on the same connection chain with the same stepping stones, a value of CV is calculated by the following Equation 2.

$$CV(k) = \max_{0 \leq s \leq r} CPF(X, Y_k, s) \, k = 1, 2, \ldots, j \quad \text{[Equation 2]}$$

For example, in the case where a lost event occurs j (j<n) number of times among n flow records in a single TPC layer 4, (j+1) time series are generated.

In this case, the generated time series may be represented as TS(1) to TS(j+1), and at this time, a value of CV is calculated by the following Equation 3.

$$CV(k) = \max_{0 \leq s \leq r-m} CPF(X, Y_k, s) \text{ when } k = j+1 \quad \text{[Equation 3]}$$

Finally, the maximum value of CV is calculated using the following Equation 4, and when the maximum value is a threshold value or more, the pertinent connections are determined to be present on the same connection chain.

$$CV = \max_k CV(k) \quad \text{[Equation 4]}$$

In S400, an original attacker is detected, in which when some of candidate connections are detected to be present on the same connection chain, the order of connections is determined based on the original attacker.

For example, when $C_1$ and $C_2$ are detected to be present on the same connection chain, it is determined whether connection times $t_s(C_1)$ and $t_e(C_1)$ of $C_1$ include connection times $t_s(C_2)$ and $t_e(C_2)$ of $C_2$.

When the connection times of $C_1$ include the connection times of $C_2$, $C_1$ becomes a stepping-stone connection that is present at an upstream of $C_2$, and when the connection times of $C_2$ include the connection times of $C_1$, it is determined that $C_2$ is positioned close to the original attacker than $C_1$.

On the other hand, when no mutual inclusion relation exists between $C_1$ and $C_2$, at least one of the two connections is not present on the connection chain, which is a falsely detected connection.

Therefore, in S400, when there is no inclusion relation of connection times between the two connections detected to be present on the same connection chain, values of CV are compared, the connection with a smaller CV is determined as a falsely detected connection, and, in turn, is removed.

By using the method of connection fingerprint generation and stepping-stone traceback based on NetFlow in accordance with the above-described embodiments, it is possible to implement the traceback on an actual network, generate a connection fingerprint, check a stepping-stone connection, and trace back the original attacker.

According to a system and method for connection fingerprint generation and stepping-stone traceback based on NetFlow in accordance with the present invention, ON/OFF modeling for connections is performed using NetFlow information provided by a router, and thus it is possible to detect stepping stones and the origin of an attack.

That is, it is possible to detect connections (stepping stones) that form a connection chain using an interactive service, such as Telnet, rlogin, SSH, etc., which is used to attack, and the system and method are implemented using the NetFlow information provided by a router, and thus there is no limitation in the application to an actual network environment and use.

Figure 6:
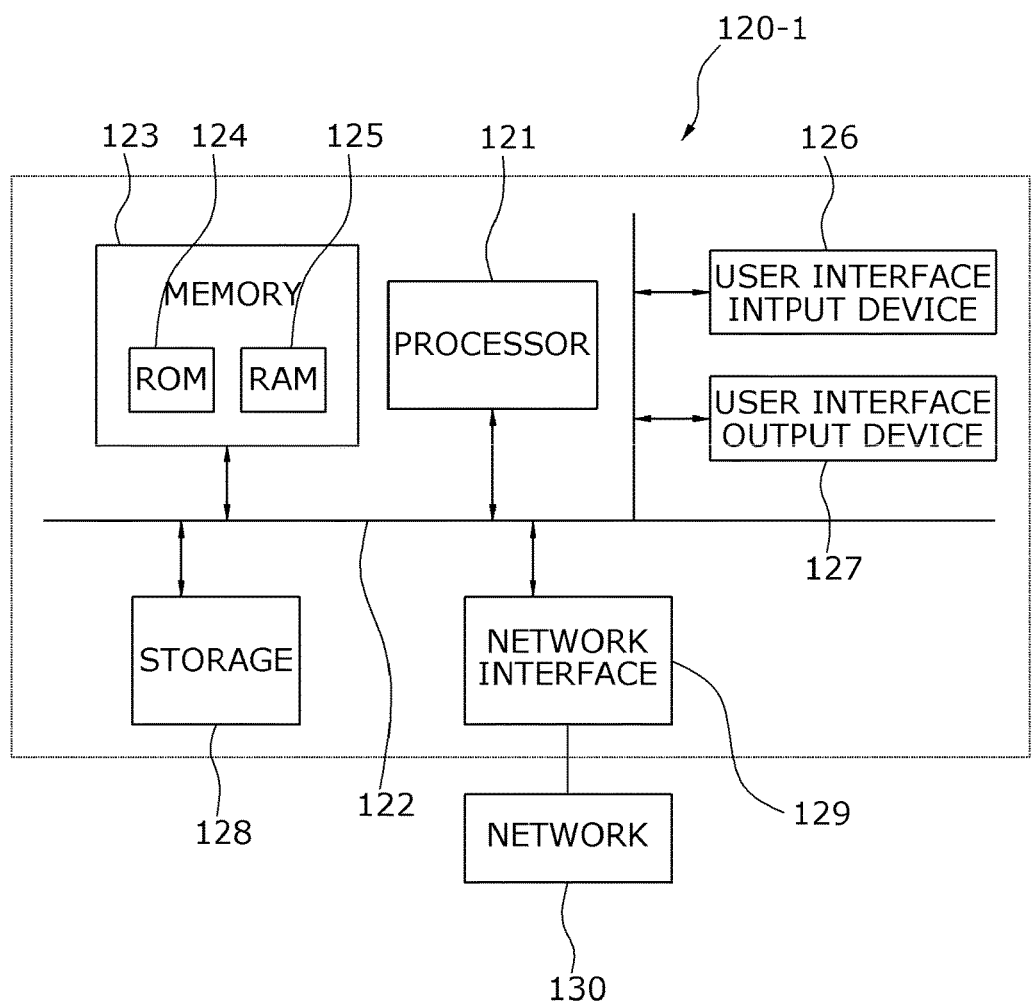
FIG. 6 is a view illustrating an example of a computer system in which a method for stitching a panoramic video according to an embodiment of the present invention is performed.

The method for stitching a panoramic video according to an embodiment of the present invention may be implemented in a computer system or may be recorded in a recording medium. FIG. 6 illustrates a simple embodiment of a computer system. As illustrated, the computer system may include one or more processors 121, a memory 123, a user input device 126, a data communication bus 122, a user output device 127, a repository 128, and the like. These components perform data communication through the data communication bus 122.

Also, the computer system may further include a network interface 129 coupled to a network. The processor 121 may be a central processing unit (CPU) or a semiconductor device that processes a command stored in the memory 123 and/or the repository 128.

The memory 123 and the repository 128 may include various types of volatile or non-volatile storage mediums. For example, the memory 123 may include a ROM 124 and a RAM 125.

Thus, the method for stitching a panoramic video according to an embodiment of the present invention may be implemented as a method that can be executable in the computer system. When the method for stitching a panoramic video according to an embodiment of the present invention is performed in the computer system, computer-readable commands may perform the producing method according to the present invention.

The method for stitching a panoramic video according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of connection fingerprint generation and stepping-stone traceback based on NetFlow, the method comprising operations of:
   (a) receiving, at a trace agent, a traceback request comprising IP packet attribute information of a victim and an attacker which corresponds to a target connection that is the last connection on a connection chain;
   (b) generating a fingerprint for an associated connection based on the IP packet attribute information and flow records from a NetFlow collector, the fingerprint including a target ON/OFF time series generated using the flow records;
   (c) detecting a stepping-stone connection to the target connection which is generated at the time of generation of the fingerprint and instructing to check whether sorted candidate connections are present on the same connection chain as the target connection, wherein detecting the stepping-stone connection includes:
      generating a candidate ON/OFF time series of the stepping-stone connection, and
      performing a correlation between the candidate ON/OFF time series and the target ON/OFF time series; and
   (d) determining an order of the candidate connections based on an attacker host when the candidate connections are determined to be present on the same connection chain as the target connection,
   wherein each ON/OFF time series comprises a respective first ON time followed by one or more respective pairs of times, each pair of times including a respective OFF time and a respective ON time, the ON times corresponding to respective ON periods of the respective connections, and the OFF times corresponding to respective OFF periods of the respective connections.

2. The method of claim 1, wherein operation (a) comprises receiving attack start time, an attack end time, an attack source IP address, an attack source port number, a destination IP address, a destination port number, and layer 3 protocol information as the IP packet attribute information.

3. The method of claim 1, wherein in operation (b), the generating of the fingerprint comprises operations of:
   (b-1) checking datagram;
   (b-2) performing sequencing of datagram;
   (b-3) checking datagram loss;
   (b-4) acquiring layer 4 connection information;
   (b-5) performing ON time merging on the flow records;
   (b-6) generating the target ON/OFF time series using flow records sorted through the ON-time merging; and
   (b-7) generating the fingerprint by taking into account the generated target ON/OFF time series.

4. The method of claim 3, wherein operation (b-1) comprises checking a version and a size of each of NetFlows collected by the NetFlow collector using version and count fields contained in a header format.

5. The method of claim 3, wherein operation (b-2) comprises performing sequencing of the collected NetFlows using SysUptime field in a header format.

6. The method of claim 3, wherein operation (b-3) comprises checking whether the datagram loss occurs, using count and flow_sequence fields contained in a header format.

7. The method of claim 3, wherein operation (b-4) comprises acquiring the layer 4 connection information using attack source IP address, destination IP address, attack source port number, destination port number, and protocol fields contained in a flow record format.

8. The method of claim 7, wherein operation (b-4) comprises sorting the connections for each layer 4 using a TCP flag with respect to a plurality of target layer 4 connections between attack start time and attack end time.

9. The method of claim 3, wherein operation (b-5) comprises sorting the flow records by comparing ON time of each flow record with a predetermined time, and removing a flow record whose ON time is shorter than the predetermined time.

10. The method of claim 3, wherein operation (b-6) comprises generating a respective ON/OFF time series for each layer 4 with respect to the sorted flow records.

11. The method of claim 10, wherein operation (b-7) comprises selecting as the target ON/OFF time series a time series with the longest length from the plurality of generated ON/OFF time series and generating the fingerprint by taking into account setup time of the target ON/OFF time series.

12. The method of claim 1, wherein operation (c) comprises sorting layer 4 connections which are maintained from connection start time to connection end time, generating a candidate ON/OFF time series of each of the sorted layer 4 connections, comparing the generated candidate ON/OFF time series with the target ON/OFF time series of the fingerprint generated in operation (b), and detecting the stepping-stone connection based on a result of the comparison.

13. The method of claim 12, wherein operation (c) comprises checking whether the candidate connection and the target connection are present on the same connection chain by performing a similarity detection algorithm using Min/Max Sum Ratio (MMS).

14. The method of claim 13, wherein operation (c) comprises calculating a similarity while increasing a correlation offset, and after a maximum value thereof is defined as a correlation value, checking whether the candidate connection and the target connection are present on the same connection chain by comparing a maximum value of the correlation value with a threshold value.

15. The method of claim 1, wherein operation (d) comprises checking whether a mutual inclusion relation is established between any two of the candidate connections in terms of connection start times and connection end times thereof, and determining a connection that is positioned close to the attacker host.

16. The method of claim 15, wherein operation (d) comprises determining a connection with a relatively small correlation value to be falsely detected in the case of the absence of mutual inclusion relation and removing the connection.

17. A system for connection fingerprint generation and stepping-stone traceback based on NetFlow, the system comprising:
   a trace agent configured to receive a traceback request including IP packet attribute information corresponding to a target connection, generate a fingerprint for an associated connection based on the IP packet attribute information, and transmit a traceback instruction, wherein the fingerprint includes a target ON/OFF time series, and wherein the target connection is a last connection on a connection chain; and a NetFlow collector configured to collect and store NetFlow information from a router, receive the traceback instruction, detect a stepping-stone connection by checking whether sorted candidate connections are present on the same connection chain as the target connection by performing a correlation between the target ON/OFF time series and respective candidate ON/OFF time series of the candidate connections, and determines an order of the candidate connections based on an attacker host when the candidate connections are determined to be present on the same connection chain as the target connection, wherein each ON/OFF time series comprises a respective first ON time followed by one or more respective pairs of times, each pair of times including a respective OFF time and a respective ON time, the ON times corresponding to respective ON periods of the respective connections, and the OFF times corresponding to respective OFF periods of the respective connections.

18. The system of claim 17, wherein the target ON/OFF time series is generated according to a flow record.

19. The system of claim 17, wherein the NetFlow collector sorts a layer whose connection is maintained from connection start time to connection end time, generates a candidate ON/OFF time series of the sorted layer, and detects a stepping-stone connection by comparing the generated candidate ON/OFF time series with the target ON/OFF time series of the fingerprint.

20. The system of claim 17, wherein, when some of the candidate connections are detected to be present on the same chain, a connection order based on an attacker host is determined or a falsely detected connection is checked by taking into account inclusion relations between the candidate connections in terms of connection times thereof.

* * * * *